(12) United States Patent
Sugiyama et al.

(10) Patent No.: US 8,813,518 B2
(45) Date of Patent: Aug. 26, 2014

(54) AIR CONDITIONER

(75) Inventors: Shinji Sugiyama, Kawasaki (JP);
Makoto Shibuya, Kawasaki (JP);
Akihiko Nojima, Kawasaki (JP)

(73) Assignee: Fujitsu General Limited, Kawasaki (JP)

( * ) Notice: Subject to any disclaimer, the term of this patent is extended or adjusted under 35 U.S.C. 154(b) by 486 days.

(21) Appl. No.: 12/719,440

(22) Filed: Mar. 8, 2010

(65) Prior Publication Data

US 2010/0236268 A1 Sep. 23, 2010

(30) Foreign Application Priority Data

Mar. 19, 2009 (JP) .................................. 2009-068876

(51) Int. Cl.
*A23L 3/36* (2006.01)
*B01D 39/00* (2006.01)

(52) U.S. Cl.
USPC ................ 62/303; 62/259.1; 62/426; 62/419; 62/416; 62/314; 55/282; 55/282.2

(58) Field of Classification Search
CPC ....... F24F 3/1603; F24F 13/28; F24F 1/0007; F24F 2003/1639; B01D 2279/50; B01D 41/04; B01D 46/0072; B01D 46/0065; B01D 46/48; F25D 31/00; F25B 2500/04
USPC ........... 62/303, 262, 272, 298, 317, 322, 340, 62/426

See application file for complete search history.

(56) References Cited

U.S. PATENT DOCUMENTS

| | | | | |
|---|---|---|---|---|
| 5,980,598 | A * | 11/1999 | Horvat ............................ | 55/294 |
| 6,155,068 | A * | 12/2000 | Hironaka ......................... | 62/303 |
| 6,164,082 | A * | 12/2000 | Okamoto et al. ............... | 62/317 |
| 6,178,765 | B1 * | 1/2001 | Hironaka et al. ............... | 62/303 |
| 6,244,954 | B1 * | 6/2001 | Hosokawa et al. ........... | 454/315 |
| 6,338,382 | B1 * | 1/2002 | Takahashi et al. .............. | 165/96 |
| 6,354,936 | B1 * | 3/2002 | Noh et al. ...................... | 454/201 |
| 6,729,154 | B2 * | 5/2004 | Takashima et al. ............. | 62/317 |
| 6,786,061 | B2 * | 9/2004 | Asami et al. .................... | 62/263 |
| 7,266,971 | B2 * | 9/2007 | Kang ................................ | 62/317 |
| 7,350,371 | B2 * | 4/2008 | Lee et al. ......................... | 62/317 |
| 7,544,223 | B2 * | 6/2009 | Oda et al. ........................ | 55/289 |
| 7,857,884 | B2 * | 12/2010 | Bohlen ............................ | 55/471 |
| 8,002,868 | B2 * | 8/2011 | Kim et al. ........................ | 55/481 |
| 8,007,574 | B2 * | 8/2011 | Iwano et al. .................... | 96/224 |
| 8,038,517 | B2 * | 10/2011 | Shibuya et al. ............... | 454/187 |
| 2002/0144513 | A1 * | 10/2002 | Gunji et al. ...................... | 62/263 |
| 2002/0189274 | A1 * | 12/2002 | Lee et al. ......................... | 62/298 |
| 2003/0029184 | A1 * | 2/2003 | Ohama et al. ................... | 62/262 |
| 2004/0000160 | A1 * | 1/2004 | Takashima et al. ............. | 62/317 |

(Continued)

FOREIGN PATENT DOCUMENTS

EP      1 376 024 A1      1/2004
JP      2007-303771      *      3/2007

(Continued)

*Primary Examiner* — Frantz Jules
*Assistant Examiner* — Martha Tadesse
(74) *Attorney, Agent, or Firm* — Venable LLP; Michael A. Sartori; Tamatane J. Aga

(57) ABSTRACT

The filter 3 is extruded to the outside of the casing of the air conditioner along the inner side of an open panel 15 which is provided at the front surface side of an air intake grill 14 and opened/closed at the time of the operation of the air conditioner.

8 Claims, 3 Drawing Sheets

(56) References Cited

U.S. PATENT DOCUMENTS

| | | | |
|---|---|---|---|
| 2004/0007002 A1* | 1/2004 | Asami et al. | 62/186 |
| 2005/0223732 A1* | 10/2005 | Kim et al. | 62/298 |
| 2005/0279116 A1* | 12/2005 | Park et al. | 62/317 |
| 2006/0032260 A1* | 2/2006 | Kang | 62/317 |
| 2006/0096459 A1* | 5/2006 | Iwano et al. | 96/224 |
| 2006/0218957 A1* | 10/2006 | Nakamura | 62/298 |
| 2007/0060036 A1* | 3/2007 | Shibuya et al. | 454/187 |
| 2008/0016897 A1* | 1/2008 | Yasutomi et al. | 62/298 |
| 2008/0134704 A1* | 6/2008 | Park et al. | 62/262 |
| 2009/0183471 A1* | 7/2009 | Shibuya et al. | 55/282.2 |
| 2009/0183521 A1* | 7/2009 | Shibuya et al. | 62/259.1 |
| 2011/0167859 A1* | 7/2011 | Shiraichi et al. | 62/303 |
| 2012/0031135 A1* | 2/2012 | Schill | 62/303 |
| 2012/0111045 A1* | 5/2012 | Ikeda et al. | 62/262 |
| 2012/0167609 A1* | 7/2012 | Kim | 62/303 |

FOREIGN PATENT DOCUMENTS

| | | |
|---|---|---|
| JP | 2007-100975 | 4/2007 |
| JP | 2007-303771 A | 11/2007 |
| JP | 2007303771 A * | 11/2007 |
| JP | 2010107082 A * | 5/2010 |
| WO | WO-2007/040074 A1 | 4/2007 |

* cited by examiner

AIR CONDITIONER

CROSS-REFERENCE TO RELATED APPLICATION

This application is based on and claims priority under 35 U.S.C. §119 from Japanese Patent Application No. 2009-068876 filed on Mar. 19, 2009.

BACKGROUND OF THE INVENTION

1. Technical Field

The present invention relates to an air conditioner (indoor unit) having a function of automatically cleaning a filter and, more particularly, relates to an air conditioner which casing is miniaturized by improving the moving path of the filter.

2. Related Art

For example, as shown in a patent document 1, some types of the indoor units of recent air conditioners have a filter cleaning function for automatically removing dust adhered to a filter.

In general, the filter cleaning function is realized in a manner that there are provided with a filter attached to a main body cabinet so as to cover an air intake port and a cleaning unit for collecting dust adhered to the filter, whereby the filter is moved within the cleaning unit to thereby collect dust adhered to the filter by the cleaning unit.

There has been another type in which the filter cleaning is realized by moving the filter or the cleaning unit. In the case of moving the cleaning unit, the sizes of the moving space of the unit and a driving motor thereof becomes large. Thus, the air conditioner more reduced in the cost and size thereof can be realized in the case of fixing the cleaning unit and driving the filter.

The air conditioner described in the patent document 1 is configured in a manner that the filter cleaning device thereof is disposed in a space between a front side heat exchanger and a front panel and the filter to be moved makes a U-turn so that the filter can be moved efficiently within a limited space.

However, the filter cleaning device described in the patent document 1 is configured to provide a detour lane dedicated for the U-turn so as to realize the U-turn of the filter within the casing, so that the space for the detour lane is additionally required.

[Patent Document 1] JP-A-2007-100975

SUMMARY OF THE INVENTION

Therefore, the invention is made in order to solve the aforesaid problem and an object of the invention is to provide an air conditioner which can clean a filter by moving a part of the filter to the outside of the casing of the air conditioner while concealing from a user's view field.

In order to attain the aforesaid object, the invention has the following features.

According to a first aspect of the invention, there is provided an air conditioner, within a casing of an indoor unit, including:
 a filter disposed along an air intake grill,
 a cleaning section for cleaning the filter,
 a filter driving section for moving the filter to a predetermined direction, and
 an open panel which is opened in a direction separating from the casing of the indoor unit and is provided in front of the air intake grill, wherein when the filter is cleaned, the open panel is opened, and the filter is extruded to the outside of the casing of the indoor unit along an inner surface of the open panel.

According to a second aspect of the invention, there is provided the air conditioner as in the first aspect, wherein the open panel is coupled to the casing of the indoor unit in a manner that a lower end side thereof is freely rotatable around a rotational axis thereof, and an upper end side thereof opens/closes around the rotational axis.

According to a third aspect of the invention, there is provided the air conditioner as in the first aspect, wherein
the open panel is opened/closed in a state of keeping substantially parallel to a front surface of the casing of the indoor unit by a predetermined open panel driving section.

According to a fourth aspect of the invention, there is provided the air conditioner as in the second aspect, wherein
the filter moves toward a tip end side of the open panel from the rotational axis side thereof.

According to a fifth aspect of the invention, there is provided the air conditioner as in any one of the first to fourth aspects, wherein
the open panel is provided with a guide portion for turning the filter extruded along the inner surface of the open panel in a U-turn.

According to a sixth aspect of the invention, there is provided the air conditioner as in any one of the first to fourth aspects, wherein
the open panel is provided with a guide portion for guiding a tip end of the filter extruded along the inner surface of the open panel within the casing of the indoor unit.

According to the invention, since the filter is extruded to the outside of the casing of the indoor unit along the inner surface of the open panel which is opened in a direction separated from the casing of the indoor unit, the open panel can be used as a concealing plate of the filter at the time of cleaning the filter. Thus, the filter can be cleaned without placing the filter within a user's view field. Further, the main body of the indoor unit can be miniaturized.

DETAILED DESCRIPTION OF THE PREFERRED EMBODIMENTS

Figure 1:
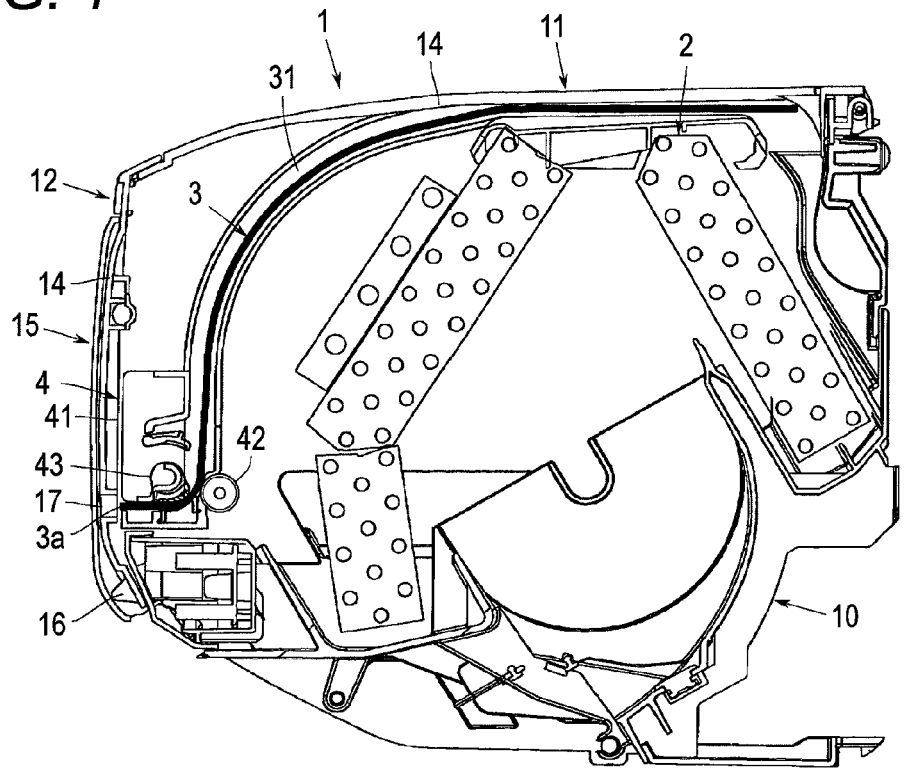
FIG. 1 is a sectional view showing the main portion of an air conditioner according to an embodiment of the invention.

Although an embodiment of the invention will be explained hereinafter with reference to drawings, the invention is not limited thereto. As shown in FIG. 1, the indoor unit 1 of the air conditioner according to the embodiment is provided with a base panel 10 supported by a wall surface via a not-shown rear plate.

A heat exchanger 2 and a cross flow fun (not shown) are supported by the base panel 10 so as to be bridged thereover. According to the invention, since the concrete configuration of each of the heat exchanger 2 and the cross flow fun is arbitral, the explanation thereof will be omitted.

Although an air blowout port, a wind direction plate, a diffuser (each not shown) etc. are provided on the lower surface side of the base panel 10, since the configurations thereof are not limited in particular in the invention, the explanation thereof will also be omitted.

The base panel 10 is provided with an upper panel 11 for covering the upper surface of the heat exchanger 2, a front panel 12 for covering the front surface of the heat exchanger 2, and not-shown side panels for supporting the left and right ends of the heat exchanger 2. In this embodiment, each of these panels is formed by a molded component of composite resin.

Each of the upper panel 11 and the front panel 12 is provided with an air intake grill 14 for introducing the air within the indoor unit 1. At a part of the front panel 12, there is provided with an open panel 15 which is opened at the time of the operation of the air conditioner to enlarge the opening area of the air intake grill 14 to thereby increase an intake air flow rate.

Figure 2:
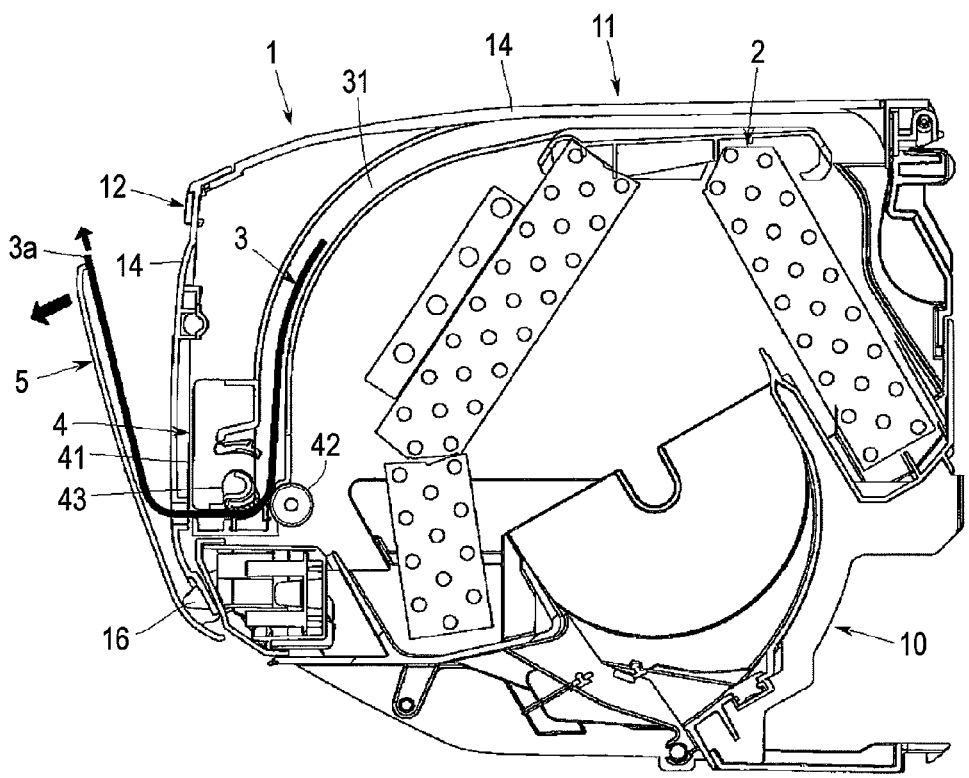
FIG. 2 is a sectional view of the main portion of the air conditioner according to the embodiment showing a state where a filter is extruded.

Also with reference to FIG. 2, the open panel 15 is formed by a plate-shaped member of composite resin and provided so as to cover the front panel 12 of the indoor unit 1. The open panel 15 is coupled at its lower end to a part of the front panel 12 via a rotation axis 16 so as to be rotatable.

The open panel 15 is configured in a manner that its upper end (free end) is opened/closed by a not-shown opening/closing drive section. In this embodiment, although the open panel 15 is opened/closed by the opening/closing drive section using a motor as a driving source, various kinds of actuators may be used instead thereof. Alternatively, the open panel may be opened/closed by suing a spring force etc.

The open panel 15 is opened/closed in response to a command from a not-shown control section. The open panel 15 is usually opened at the time of the operation of the air conditioner, the filter 3 can be cleaned without to thereby form a large opening portion directed to the heat exchanger 2 on the front panel 12 side.

Within the indoor unit 1, filters 3 are provided on the heat exchanger 2 side of the air intake grill 14 so as to be detachable freely in this embodiment. Each of the filters 3 is configured to have a thin plate shape and provided along the inner side of the air intake port. A rack (not shown) to be meshed with a filter driving section 42 described later is formed at the frame (not shown) of each of the filters 3.

Each of the filters 3 is attached so as to be slidable along filter guides 31 formed at the indoor unit 1. A pair of the filter guides 31 are provided so as to support the filter 3 from the both sides thereof and each of the filter guides is formed in an arch shape along the heat exchanger 2 from the upper panel 11 to the front panel 12. Since each of the filters 3 is disposed along the filter guides 31, the filters 3 are disposed on the upstream side of the heat exchanger 2.

Within the indoor unit 1, a filter cleaning unit 4 for cleaning the filters 3 is further provided. The filter cleaning unit 4 includes a dust box 41 for collecting dust adhered to the filters 3 and the filter driving section 42 for moving the filters 3 via the space within the dust box 41.

The dust box 41 is disposed at the lower side of the inner periphery of the front panel 12 and houses therein a cleaning brush 43 which is made contact with the filter 3 to scrape dust off the filter. The concrete configurations of the dust box 41 and the cleaning brush 43 are not limited to particular ones so long as they have basic mechanisms capable of colleting dust adhered to the filters.

The filter driving section 42 is configured by a gear (not shown) driven by a not-shown motor and is meshed with a rack (not shown) formed at the frame of the filter 3. The filter driving section 42 is configured to move the filters 3 in response to a command from the not-shown control mans.

A filter protruding port 17 for protruding the filters 3 to the outside of the casing of the indoor unit is provided at the lower end side of the front panel 12 and a filter moving path is secured within the dust box 41 in adjacent to the filter protruding port 17.

According to such the configuration, when the filter 3 is moved downward by the filter driving section 42, the tip end 3a of the filter 3 is extruded to the outside of the casing of the indoor unit via the filter protruding port 17. The filter 3 thus extruded is guided upward along the inner side of the open panel 15 as shown in FIG. 2.

In this case, since the open panel 15 is directed toward the floor of a room, a user never directly sees the movement of the filter. Thus, a user hardly feels unpleasantness.

In this embodiment, although the inner periphery (the front panel 12 side) of the open panel 15 is formed to have a smooth surface so that the filter is not caught by the inner periphery, the filter 3 is extruded over the upper end of the open panel when the filter 3 is longer than the open panel 15.

Figure 3A:
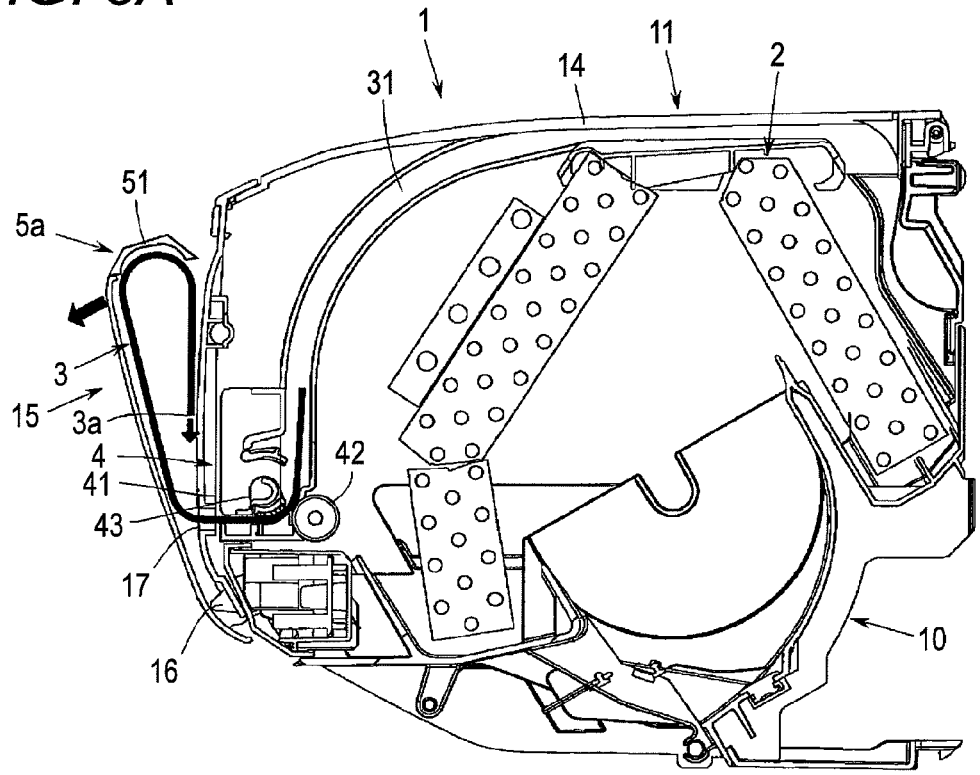
FIGS. 3A and 3B show schematic diagrams showing a state where a guide is attached to the part of an open panel.

Thus, as a more preferable mode, it is preferable to provide a guide portion for changing the moving direction of the filter 3 on the upper end side of the open panel 15. As shown in FIG. 3A, the guide portion 5a is integrally attached to the upper end of the open panel 15 so as to have an arch shape and is provided with a turn guide surface 51 for making the tip end 3a of the filter 3 a U-turn.

The guide portion 5a is configured so as to be able to be withdrawn within the casing of the indoor unit from the front panel 12 in the closed state of the open panel 15. The shape of the guide portion 5a may be selected arbitrarily so long as it has a shape not interfering the opening/closing operation of the open panel 15 at the time of the opening/closing.

Figure 3B:
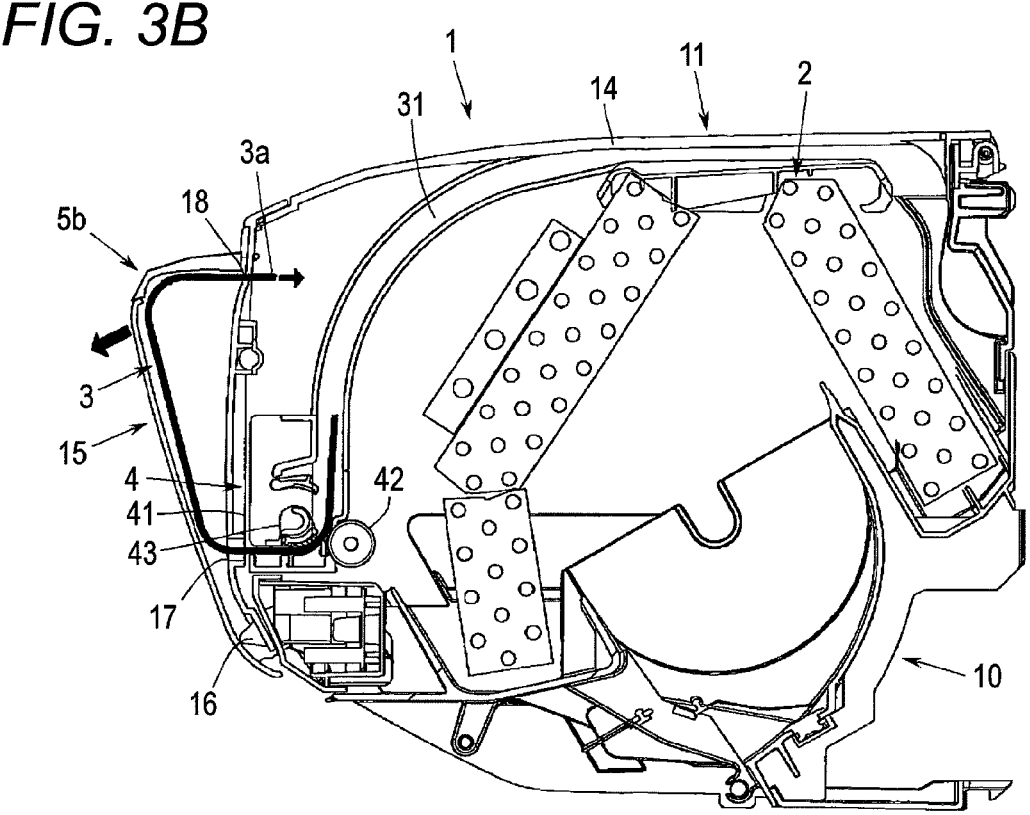

As another modified example, as shown in FIG. 3B, a guide portion 5b is integrally attached to the upper end of the open panel 15 so as to have an L-shape and is provided with a turn guide surface 51 for bending the tip end 3a of the filter 3 by about 90 degree.

In this example, the front panel 12 is provided with a filter introducing port 18 for introducing the tip end 3a of the filter 3 again within the indoor unit. According to this configuration, since the filter 3 is bent by about 90 degree by the guide portion 5b and further the part of the filter 3 is introduced within the indoor unit, the filter 3 can be cleaned without placing the filter 3 within a user's view field.

In this embodiment, the open panel 15 is configured so as to be opened/closed in a freely rotatable manner around the rotational axis at the lower end side thereof. However, in order to realize the filter cleaning function, the invention can be applied to the air conditioner having the open panel 15 provided with an opening/closing mechanism other than the aforesaid types.

Figure 4:
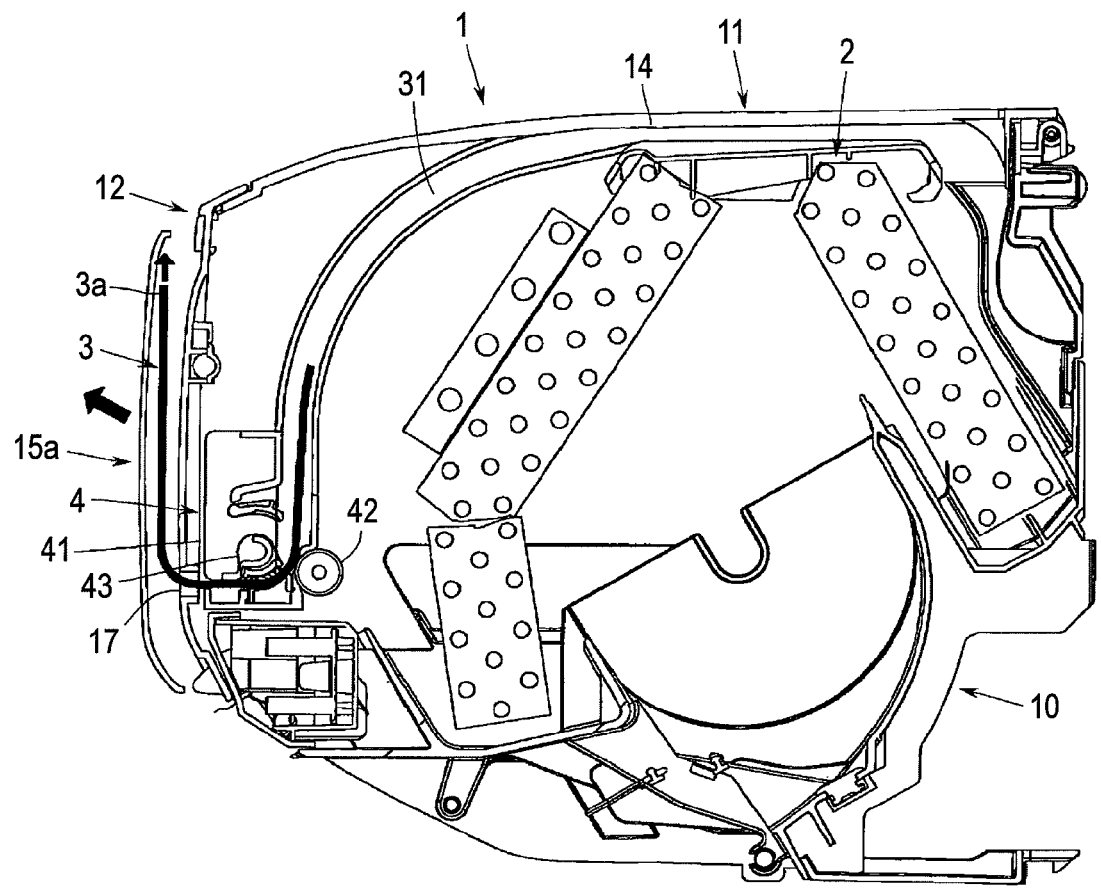
FIG. 4 is a sectional view of the main portion showing a modified example of the open panel.

For example, as shown in FIG. 4, an open panel 15a is configured to be opened/closed so as to be moved in a state of keeping substantially parallel to the front panel 12. In this example, the open panel 15a is controlled so as to be moved in a direction perpendicular to the front panel (left and right direction in FIG. 4) by a motor.

In the arrangement using the open panel 15a, also the filter 3 can be extruded to the outside of the casing of the indoor unit along the inner periphery of the open panel 15a. Since the open panel 15a is configured to be opened/closed so as to keep substantially parallel to the front panel, it is more preferable to provide, near the outlet of the filter protruding port 17, a guide for guiding the filter 3 along the open panel 15a.

In this embodiment, although the open panel 15 is configured to cover the air intake grill 14 of the front panel 12, the open panel may be configured in a manner that a part of the open panel covers the upper panel 11, for example. That is, the configuration of the open panel may be changed arbitrarily according to the specification so long as the open panel is opened at the time of the operation.

What is claimed is:

1. An air conditioner, within a casing of an indoor unit, comprising:
    a filter configured to have a thin plate shape and disposed along an air intake grill,
    a cleaning section for cleaning the filter,
    a filter driving section for moving the filter to a predetermined direction,
    an open panel which is opened in a direction separating from the casing of the indoor unit and is provided in front of the air intake grill,
    a front panel configured to cover a front surface of the indoor unit, and
    a guide portion configured to have an arch shape,
    wherein the guide portion is integrally attached to the upper end of the open panel,
    wherein the guide portion is configured to be able to be withdrawn within the casing of the indoor unit from the front panel in a closed state of the open panel,
    wherein the guide portion is provided with a turn guide surface for turning a tip end of the filter extruded along an inner surface of the open panel in a U-turn,
    wherein an inner surface of the open panel guides the filter by contacting with an outer surface of the filter and the turn guide surface of the guide portion is continuous with the inner surface of the open panel as a part of the inner surface of the open panel, and
    wherein when the filter is cleaned, the open panel is opened, and the filter is extruded to the outside of the casing of the indoor unit along the inner surface of the open panel.

2. The air conditioner as in claim 1, wherein
    the open panel is coupled to the casing of the indoor unit in a manner that a lower end side thereof is freely rotatable around a rotational axis thereof, and
    an upper end side thereof opens/closes around the rotational axis.

3. The air conditioner as in claim 1, wherein
    the open panel is opened/closed in a state of keeping substantially parallel to a front surface of the casing of the indoor unit by a predetermined open panel driving section.

4. The air conditioner as in claim 2, wherein
    the filter moves toward a tip end side of the open panel from the rotational axis side thereof.

5. An air conditioner, within a casing of an indoor unit, comprising:
    a filter configured to have a thin plate shape and disposed along an air intake grill,
    a cleaning section for cleaning the filter,
    a filter driving section for moving the filter to a predetermined direction,
    an open panel which is opened in a direction separating from the casing of the indoor unit and is provided in front of the air intake grill,
    a front panel configured to cover a front surface of the indoor unit, and
    a guide portion configured to have an L-shape,
    wherein the guide portion is integrally attached to the upper end of the open panel,
    wherein the guide portion is configured to be able to be withdrawn within the casing of the indoor unit from the front panel in a closed state of the open panel,
    wherein the guide portion is provided with a turn guide surface for guiding a tip end of the filter extruded along an inner surface of the open panel within the casing of the indoor unit,
    wherein an inner surface of the open panel guides the filter by contacting with an outer surface of the filter and the turn guide surface of the guide portion is continuous with the inner surface of the open panel as a part of the inner surface of the open panel, and
    wherein when the filter is cleaned, the open panel is opened, and the filter is extruded to the outside of the casing of the indoor unit along the inner surface of the open panel.

6. The air conditioner as in claim 5, wherein
    the open panel is coupled to the casing of the indoor unit in a manner that a lower end side thereof is freely rotatable around a rotational axis thereof, and an upper end side thereof opens/closes around the rotational axis.

7. The air conditioner as in claim 5, wherein
    the open panel is opened/closed in a state of keeping substantially parallel to a front surface of the casing of the indoor unit by a predetermined open panel driving section.

8. The air conditioner as in claim 6, wherein
    the filter moves toward a tip end side of the open panel from the rotational axis side thereof.

* * * * *